United States Patent [19]
Sadri et al.

[11] Patent Number: 5,603,592
[45] Date of Patent: Feb. 18, 1997

[54] HIGH STRENGTH BLIND BOLT WITH UNIFORM HIGH CLAMP OVER AN EXTENDED GRIP RANGE

[75] Inventors: Shahriar M. Sadri, San Clemente; Mark R. Plunkett, Irvine; Marvin R. Hicks, Riverside, all of Calif.

[73] Assignee: Huck International, Inc., Irvine, Calif.

[21] Appl. No.: 317,293

[22] Filed: Oct. 3, 1994

[51] Int. Cl.[6] ................................................ F16B 13/04
[52] U.S. Cl. ............................................ 411/34; 411/39
[58] Field of Search ................................. 411/34–43, 3, 411/5

[56] References Cited

U.S. PATENT DOCUMENTS

| | | |
|---|---|---|
| 2,061,628 | 11/1936 | Huck . |
| 2,061,629 | 11/1936 | Huck . |
| 2,099,678 | 11/1937 | Curtis . |
| 2,114,493 | 4/1938 | Huck . |
| 2,282,711 | 5/1942 | Eklund . |
| 2,324,142 | 7/1943 | Eklund ............................ 411/38 |
| 2,527,307 | 10/1950 | Huck . |
| 2,765,699 | 10/1956 | LaTorre . |
| 2,795,989 | 6/1957 | Koenig . |
| 2,887,003 | 5/1959 | Brilmyer . |
| 2,905,045 | 9/1959 | Vance . |
| 3,107,572 | 10/1963 | Orloff . |
| 3,129,630 | 4/1964 | Wing et al. . |
| 3,136,204 | 6/1964 | Reynolds . |
| 3,202,036 | 8/1965 | Simko . |
| 3,222,977 | 12/1965 | Vaughn . |
| 3,236,143 | 2/1966 | Wing . |
| 3,253,495 | 5/1966 | Orloff . |
| 3,262,353 | 7/1966 | Waeltz et al. . |
| 3,277,771 | 10/1966 | Reynolds . |
| 3,311,147 | 3/1967 | Walker . |
| 3,345,900 | 10/1967 | Villo . |
| 3,377,907 | 4/1968 | Hurd . |
| 3,473,431 | 10/1969 | King, Jr. . |
| 3,515,028 | 6/1970 | Patton . |
| 3,524,489 | 8/1970 | King, Jr. . |
| 3,643,544 | 2/1972 | Massa . |
| 3,657,956 | 4/1972 | Bradley et al. . |

(List continued on next page.)

FOREIGN PATENT DOCUMENTS

| | | |
|---|---|---|
| 1300950 | 7/1962 | France . |
| 2652395 | 3/1991 | France . |
| 2016106 | 9/1979 | United Kingdom . |

OTHER PUBLICATIONS

The Huck BOM® Fastening System, High strength blind fasteners for structural applications, ©1987 Huck Manufacturing Company.
TAU BOLT® Fastener, Carbon Steel 3BL, Huck Manufacturing Company.
TAU BOLT® Fastener, Alloy Steel BL, Huck Manufacturing Company.

Primary Examiner—Flemming Saether
Attorney, Agent, or Firm—Harness, Dickey & Pierce P.L.C.

[57] ABSTRACT

In general a blind fastener for securing workpieces is shown and which blind bolt has a core pin with a blind side head and a plurality of threads or locking grooves and a nut adapted to be threaded onto the pin threads; the blind bolt which has a main sleeve structure and an expandable blind side sleeve structure is set by a relative axial force applied to the pin which forces the expandable sleeve structure against the main sleeve structure causing the expandable sleeve to expand and form a load bearing blind head; the blind fastener includes a grip adjuster structure which defines a cavity having a depth selected to define the grip range of the fastener with the grip cavity generally located externally of the workpieces; the core pin head acts on the expandable sleeve and main sleeve structures to cause a frangible portion in the grip adjuster structure to shear and receive the main sleeve structure after which the blind head engages the blind side of the workpieces, with none of the clamp load developed being shared by the main sleeve structure. The blind threaded fastener can be adapted to be installed by the same installation tool used to install non-blind threaded fasteners of the same nominal diameter.

30 Claims, 6 Drawing Sheets

U.S. PATENT DOCUMENTS

| | | | |
|---|---|---|---|
| 3,786,612 | 1/1974 | Baker . | |
| 3,835,615 | 9/1974 | King, Jr. . | |
| 3,878,760 | 4/1975 | Jeal et al. . | |
| 3,965,792 | 6/1976 | King, Jr. . | |
| 4,012,984 | 3/1977 | Matuschek . | |
| 4,077,299 | 3/1978 | King, Jr. . | |
| 4,089,247 | 5/1978 | Dahl et al. . | |
| 4,157,675 | 6/1979 | King, Jr. . | |
| 4,168,650 | 9/1979 | Dahl et al. . | |
| 4,203,346 | 5/1980 | Hall et al. . | |
| 4,289,060 | 9/1981 | Emmett . | |
| 4,289,061 | 9/1981 | Emmett . | |
| 4,293,259 | 10/1981 | Liebig . | |
| 4,312,613 | 1/1982 | Binns . | |
| 4,364,697 | 12/1982 | Binns . | |
| 4,370,081 | 1/1983 | Briles . | |
| 4,376,604 | 3/1983 | Pratt . | |
| 4,451,189 | 5/1984 | Pratt . | |
| 4,457,652 | 7/1984 | Pratt . | |
| 4,521,147 | 6/1985 | King, Jr. . | |
| 4,579,491 | 4/1986 | Kull . | |
| 4,580,936 | 4/1986 | Francis | 411/38 |
| 4,627,775 | 12/1986 | Dixon . | |
| 4,659,271 | 4/1987 | Pratt . | |
| 4,659,272 | 4/1987 | Pratt . | |
| 4,699,552 | 10/1987 | Jeal . | |
| 4,752,169 | 6/1988 | Pratt . | |
| 4,765,787 | 8/1988 | Briles | 411/41 |
| 4,772,167 | 9/1988 | Beals . | |
| 4,813,834 | 3/1989 | Smith . | |
| 4,815,906 | 3/1989 | Binns . | |
| 4,826,372 | 5/1989 | Kendall | 411/38 |
| 4,832,548 | 5/1989 | Strobel . | |
| 4,865,499 | 9/1989 | Lacey . | |
| 4,867,625 | 9/1989 | Dixon . | |
| 4,877,363 | 10/1989 | Williamson et al. . | |
| 4,900,205 | 2/1990 | Sadri . | |
| 4,919,577 | 4/1990 | Binns . | |
| 4,921,384 | 5/1990 | Nordyke . | |
| 4,950,115 | 8/1990 | Sadri . | |
| 4,979,857 | 12/1990 | Wing | 411/5 |
| 5,006,024 | 4/1991 | Siebol . | |
| 5,090,852 | 2/1992 | Dixon . | |
| 5,108,238 | 4/1992 | Ewing . | |
| 5,178,502 | 1/1993 | Sadri . | |
| 5,213,460 | 5/1993 | Sadri et al. . | |
| 5,248,231 | 9/1993 | Denham | 411/38 |
| 5,252,014 | 10/1993 | Andrews . | |
| 5,259,713 | 11/1993 | Rener et al. . | |
| 5,263,804 | 11/1993 | Ernst et al. . | |
| 5,267,423 | 12/1993 | Giannuzzi . | |

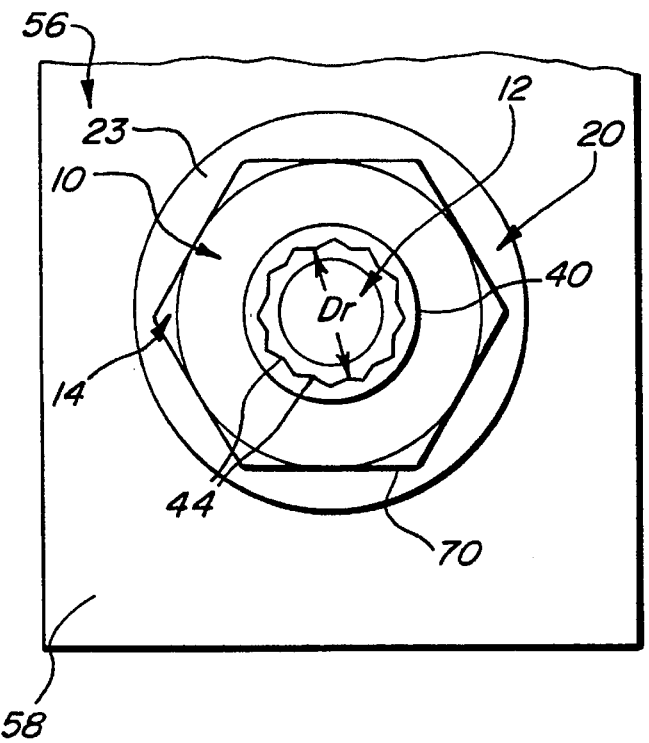
*Fig-1A*
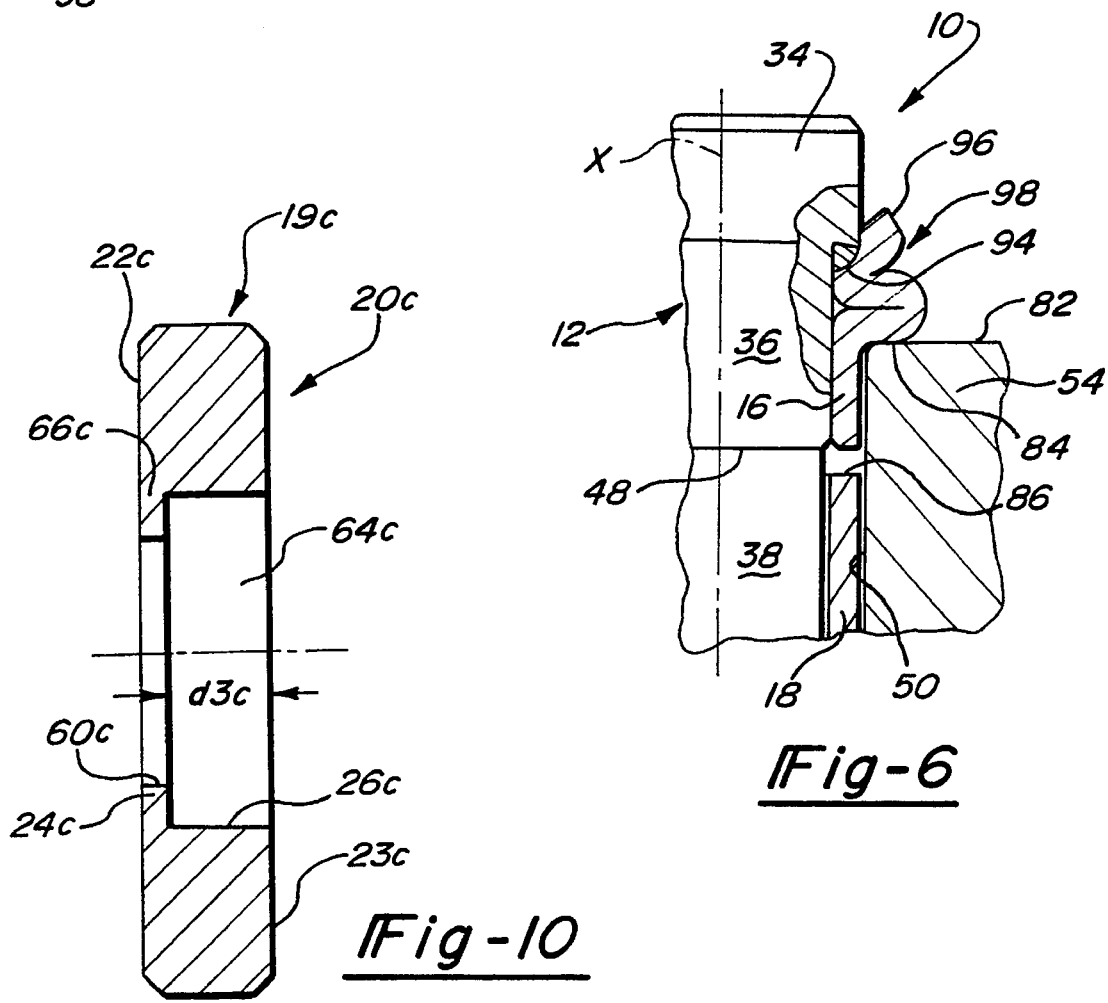
*Fig-10*
*Fig-6*

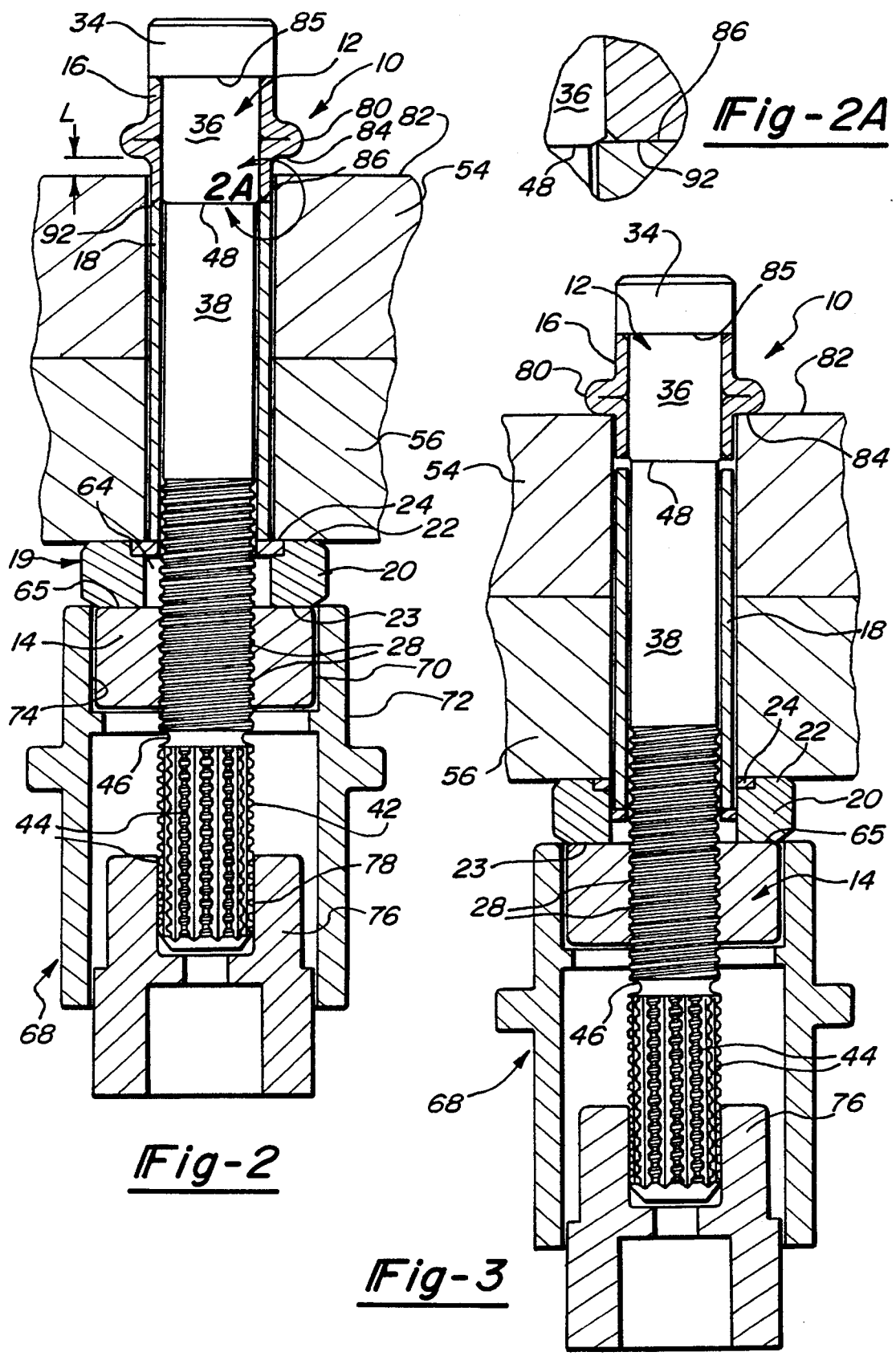

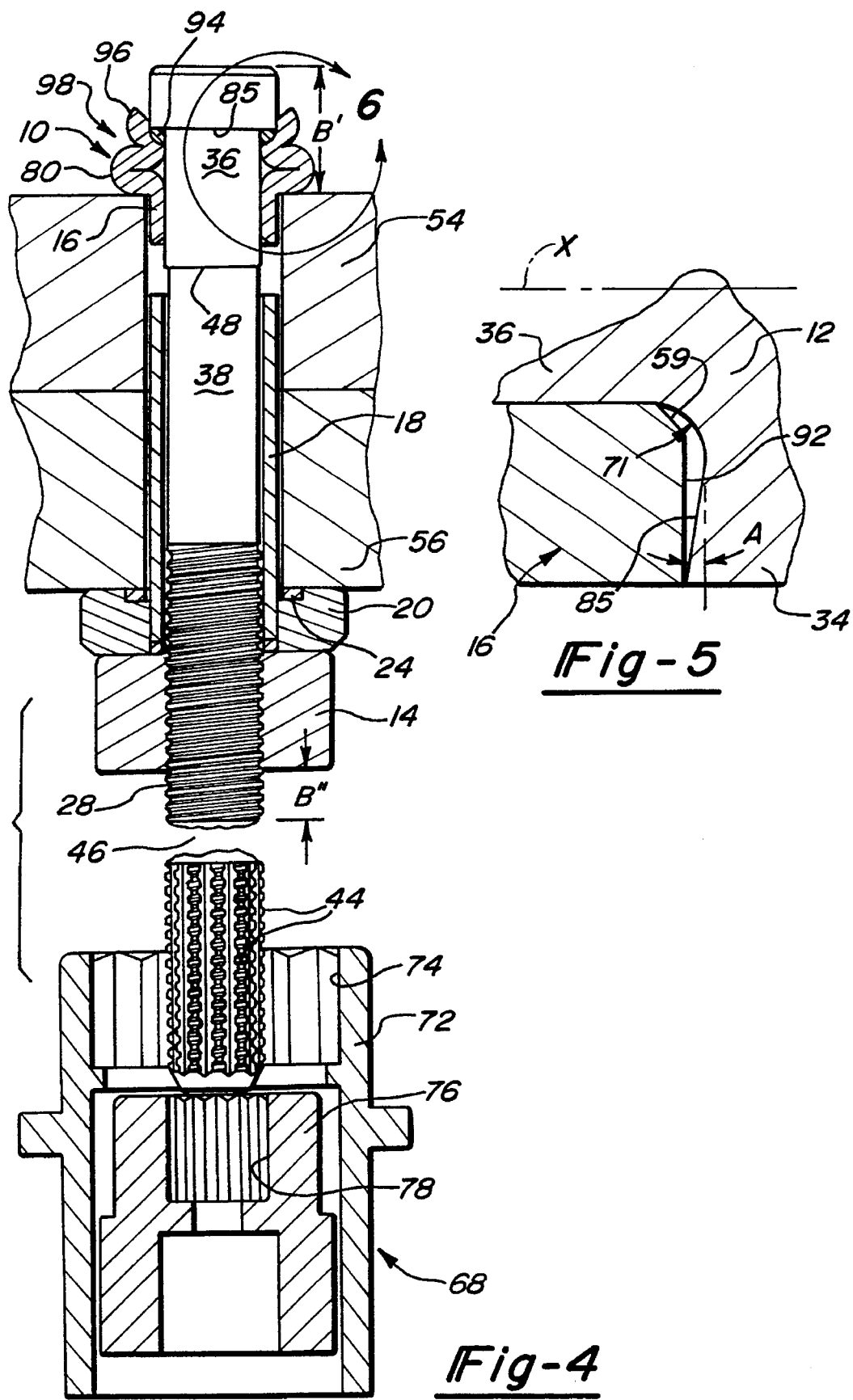

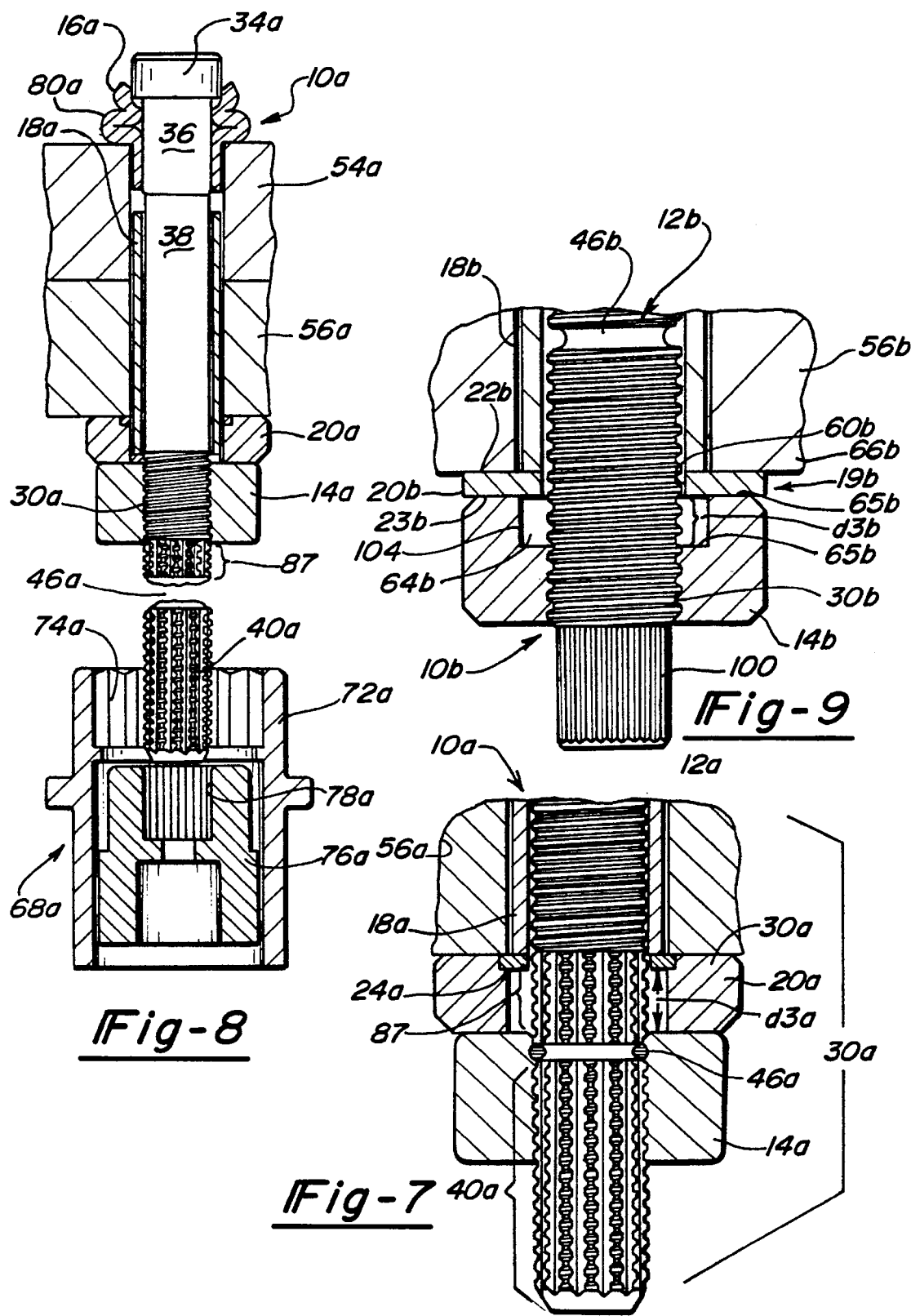

HIGH STRENGTH BLIND BOLT WITH UNIFORM HIGH CLAMP OVER AN EXTENDED GRIP RANGE

CROSS REFERENCE TO RELATED PATENTS

The present invention is related to United States patents for High Strength Blind Bolt issued Jan. 12, 1993, under U.S. Pat. No. 5,178,502 and High Strength Blind Bolt With Uniform High Clamp Over An Extended Grip Range issued May 25, 1993 under U.S. Pat. No. 5,213,460.

SUMMARY BACKGROUND OF THE INVENTION

The present invention relates to multi-piece fasteners and more particularly to a high strength blind bolt of the threaded torque type or the pull type using a swaged construction and providing a high final clamp load of workpieces secured together. As noted in the above related patents such blind fasteners, while of general utility, can be particularly useful in constructions utilizing box beams or columns, bridges and the like and more particularly in applications where accessibility on one side of the workpiece is blocked or limited.

The fastener of the present invention also relates generally to multi-piece blind bolt fasteners which include a main sleeve, an expandable sleeve and a pin wherein the expandable sleeve is expanded radially to form a blind head in response to a relative axial force applied via the pin. In this regard the blind bolt of the present invention, in addition to the patents noted above, is generally related to threaded blind fasteners of the type shown in U.S. Pat. No. 3,643,544 issued Feb. 22, 1972 to Joseph H. Massa; fasteners of this type have been sold under the trade names Visu-Lok and/or Jo-Bolt by the Monogram Aerospace Fastener Company and Voi-Shan Manufacturing Company of the United States. See also U.S. Pat. No. 3,262,353 issued Jul. 26, 1966 to R. Waeltz et al, U.S. Pat. No. 2,765,699 issued Oct. 9, 1956 to J. LaTorre, U.S. Pat. No. 2,887,003 issued May 19, 1959 to Brilmeyer and U.S. Pat. No. 3,107,572 issued Oct. 22, 1963 to Orloff. As noted in the related U.S. Pat. No. 5,213,460 the prior blind bolt fasteners have certain problems since the main sleeve can absorb a significant portion of the force available to develop the clamp load and in addition the clamp load, tensile strength and blind side protrusion can vary within the grip range of the fastener. In this regard the grip range of the fastener is defined by the difference between the maximum total thickness and the minimum total thickness of workpieces which can be secured together by a single fastener. In the present invention, however, a unique blind bolt construction is provided having a wide grip range capability and in which a high strength blind head of a uniform structure is formed over this wide grip range. Thus the blind head of uniform structure will have the same blind side protrusion over the grip range. In addition the present invention provides a structure in which high strength materials can be used resulting in a high strength fastener while at the same time achieving a high, uniform clamp force.

In one form of the invention, a tension controlled type threaded nut and core bolt or pin construction is used. In this embodiment a nut member is threadably engaged on a threaded portion of the shank of the pin. A splined portion is located at the terminal end of the pin shank. An installation tool has a central socket member adapted to engage the splined portion and an outer wrench member adapted to grip the nut whereby torque can be applied between the core bolt or pin and the nut to provide relative rotation by which the nut is threaded onto the pin to attain the desired clamp up. A pair of sleeves, an expandable sleeve and a main sleeve, located on the pin cooperate to form a blind head in response to the applied torque.

In the present invention with the torque type construction, as a result of the applied torque between the nut and the pin, the nut initially transmits an axial force to the main sleeve via a grip adjuster. At the same time, the pin has an enlarged head which transmits an opposite axial force against the expandable sleeve. As the torque and resultant relative axial force increases, the expandable sleeve, reacting against the main sleeve, is radially expanded to form a blind head. As will be seen a blind head of uniform shape is provided over the extended grip range of the fastener.

At this stage of the installation the workpieces have not been subjected to any clamp loads between the nut and grip adjuster and the blind head via the pin. In order to bring the blind head into engagement with the blind side surface, the grip adjuster is provided with a frangible, resistance or shear member which is in blocking communication with a cavity. The frangible shear or resistance structure is adapted to fracture at a preselected magnitude of relative axial force whereby the cavity which is no longer blocked is now accessible permitting axial movement of the main sleeve away from or out of load bearing relationship with the expandable sleeve; this permits the fully formed blind head to be brought into contact with the blind side surface of the workpieces with no axial restraint from the main sleeve which has moved substantially freely out of load bearing engagement with the expandable sleeve. Now the workpieces are pulled together by the further application of torque with the resultant relative axial force acting substantially solely between the blind head through the pin and the nut. The force clamping the workpieces together continues to increase until a magnitude of torque is attained at which a splined, pintail portion on the core bolt or pin is fractured from the pin. This fracture load determines the final clamp load on the workpieces. In one form of the present invention the blind bolt employs a core bolt or pin having a splined end portion in which the spline crests are of generally the same diameter as the crests of the adjacent bolt threads; a continuous thread form extends across the splined portion and the threaded portion. By providing a pin with such a splined structure, a conventional double socket drive tool used for non-blind, tension control bolts can also be used for installing the noted blind tension control bolts for use in workpiece bores of the same diameter. In a variation on the noted splined structure the splined portion of the pin thread is extended past the breakneck groove. This additional splined portion will remain after fracture of the breakneck groove and removal of the pintail. Thus this additional splined portion at the end of the fractured pin can be utilized to facilitate removal or retorquing of the fastener after it has been set.

As will be seen, the grip adjuster can be of a relatively simple construction and can be made of a high strength material whereby the strength of the frangible resistance or shear portion can be set at a high level. In this regard, this relatively simple construction readily allows the load for shearing the frangible resistance portion to be set at a level high enough to guarantee formation of the blind head and low enough to fracture before attainment of the final torque load for final clamp and fracture of the breakneck.

In one form of the invention both the main and expandable sleeves can be of generally straight tubular constructions of generally uniform cross-sections, i.e. without any significant change of cross section along their lengths, and the blind head is formed, through column loading, by bulbing a portion of the expandable sleeve which is located beyond the blind side of the workpieces. In this regard, this type of structure is generally of the kind shown in U.S. Pat. Nos. 2,061,628 and 2,061,629 issued Nov. 24, 1936 to Huck, U.S. Pat. No. 2,114,493 issued Apr. 19, 1938 to Huck and U.S. Pat. No. 2,527,307 issued Oct. 24, 1950 to Huck. Formation of the blind head at a preselected location can be facilitated by annealing a circular band on the expandable sleeve at the desired location. See in this regard U.S. Pat. No. 3,253,495 issued to Orloff on May 31, 1966. As will be seen the bulbed blind head can provide an enlarged bearing surface and hence be especially useful in applications in which the workpiece openings are substantially larger than the effective diameter of the fastener.

Another form of blind head frequently employed with blind fasteners is referred to as a tuliped blind head. An example of a blind head of a tulip shape is shown in the U.S. Pat. No. 3,136,204 issued Jun. 9, 1964 to P. J. Reynolds; see also U.S. Pat. No. 4,012,984 Issued Mar. 22, 1977 to Matuschek, U.S. Pat. No. 4,451,189 issued May 29, 1984 to Pratt and U.S. Pat. No. 4,627,775 issued Dec. 9, 1986 to Dixon. In one form of the invention where a blind tuliped head is formed, this is done by forming the blind head to have a final form including both bulbed and tuliped blind head constructions whereby the strength of the blind head is increased.

As noted with the fastener of the present invention, a unique construction is provided in which the final clamp load onto the workpieces is maximized and none is absorbed by the sleeve structure; at the same time the fastener can be provided with a determinable, wide grip range and the maximized final clamp load will be generally uniformly available over this wide grip range. As will be seen, one form of the present invention inhibits distortion of the expandable sleeve by providing a structure for controlling the magnitude of axial force applied to the expandable sleeve after the formation of the bulbed head but prior to fracturing the frangible resistance or shear member. Such distortion could result in a reduction in the final clamp load attained on the workpieces.

While features of the present invention are shown in conjunction with a threaded fastener, it can be understood from U.S. Pat. No. 5,213,460, supra, that certain of these features can be applied to pull type and swage type fasteners. At the same time, features of the present invention can be utilized with fasteners having the blind head formed by radial expansion of an expandable sleeve by a tapered nose portion on a main sleeve member, see U.S. Pat. Nos. 5,178,502 and 5,213,460, supra.

Thus the high strength blind bolt of the present invention is readily adaptable for use in applications utilizing high strength bolts, such as those meeting ASTM A325 or Japanese F8T specifications. It is also desirable for use where blind welding, nut plates and other complex construction fastening systems are used in such structural elements such as box beams where there is no access to the backside of the joint. In this regard, the blind fastener of the present invention is especially suited in the construction of buildings, bridges, and the like where high strength and durability are of considerable importance along with the capability of providing high clamp loads.

Thus it is an object of the present invention to provide a unique blind bolt construction facilitating the use of high strength materials resulting in a high strength fastener having a wide grip range.

It is another object of the present invention to provide a blind bolt construction including a unique grip adjuster for providing a wide grip range.

It is another object of the present invention to provide a unique blind bolt construction including features for controlling the blind head formation load on the expandable sleeve, providing a splined portion of maximum diameter, and hence increased strength, and providing a blind head having a combined bulbed and tuliped formation.

It is another general object of the present invention to provide a unique high strength blind bolt of a construction that forms a high strength blind head having a uniform, desired configuration over a wide grip range.

It is still another general object of the present invention to provide a unique high strength blind bolt which provides a high final clamp load.

It is another general object of the present invention to provide a unique high strength blind bolt utilizing a tension control type threaded construction and providing a generally uniform final clamp load over a wide grip range.

Other objects, features and advantages of the present invention will become apparent from the subsequent description and the appended claims, taken in conjunction with the accompanying drawings, in which:

DESCRIPTION OF THE VIEWS OF THE DRAWINGS

FIG. 1A is an end view, to reduced scale, of the fastener of FIG. 1 taken generally in the direction of the Arrows 1A in FIG. 1;

FIG. 2 is a view similar to FIG. 1, to reduced scale, showing the blind fastener after the expandable sleeve has been radially expanded at a point away from the workpiece surface, by an installation tool partially shown, to form a bulbed blind head;

FIG. 2A is a fragmentary partial sectional view to increased scale of the portion of the fastener of FIG. 2 taken generally in the area of the circle 2A in FIG. 2;

FIG. 3 is a view similar to FIG. 2 showing the blind fastener after the bulbed blind head has been formed and a frangible resistance portion of the grip adjuster structure has been fractured permitting the main sleeve to move axially into a cavity with the bulbed blind head in engagement with the rear workpiece surface;

FIG. 4 is a view similar to FIGS. 2 and 3 showing the blind fastener after the formation of a tuliped blind head in cooperation with the bulbed blind head and after the fastener has been finally set;

FIG. 5 is a fragmentary, sectional view to enlarged scale depicting a portion of the head of the pin taken generally in the area of the circle 5 in FIG. 1 and having a construction for assisting in the formation of the tuliped portion of the blind head;

FIG. 6 is a fragmentary, partial sectional view to enlarged scale of a portion of the fastener of FIG. 4 illustrating the combination tuliped and bulbed blind head and taken generally in the area of the circle 6 in FIG. 4;

FIG. 7 is a fragmentary sectional view of a blind fastener having a construction similar to that of FIGS. 1–6 in which the threaded splined portion is extended inwardly beyond the breakneck to facilitate removal and/or retorquing;

FIG. 8 is a view similar to FIG. 4 showing the blind fastener of FIG. 7 after it has been finally set;

FIG. 9 is a fragmentary, partial sectional view of a blind fastener including a full sized washer and cavity in the nut to act as a modified form of the grip adjuster;

FIG. 10 is a sectional view of a different form of grip adjuster of a one piece construction.

DESCRIPTION OF EMBODIMENTS OF THE INVENTION

Figure 1:
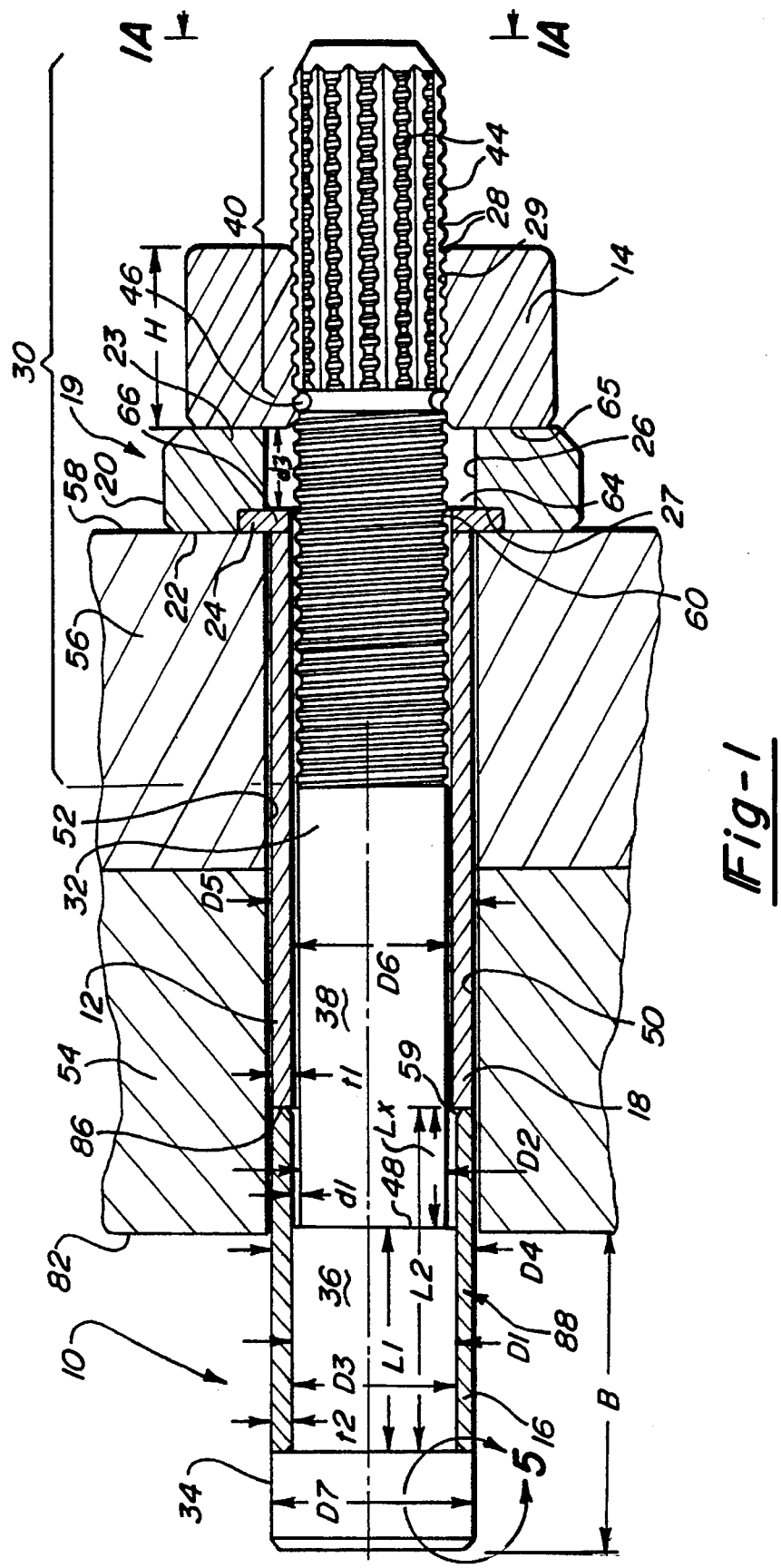
FIG. 1 is a longitudinal view, with some portions shown in section, of a blind fastener of the present invention including a core bolt or pin, a nut, an expandable sleeve, a main sleeve and a grip adjuster structure in assembly relationship with workpieces to be secured together.

Looking now to FIG. 1, a threaded or torque type blind fastener 10 includes a core bolt or pin 12, an annular nut 14, an expandable sleeve 16, a main sleeve 18 and a grip adjuster construction or assembly 19 defined by a load bearing or hold-off washer 20 and a frangible resistance or shear washer 24. The bearing washer 20 has opposite annular load bearing surfaces 22 and 23 and a central through bore 26 with an enlarged counterbore 27 at its inner end. The shear washer 24 is of a diameter to be snugly received within the counterbore 27 in bearing washer 20. In this regard the axial depth of the counterbore 27 is generally the same or slightly greater than the thickness of the shear washer 24. The shear washer 24 extends radially inwardly partially into the bore 26 to partially block the bore 26 for a purpose to be described. The nut 14 has a threaded bore 29 whereby the nut 14 can be threaded onto mating threads 28 on a threaded portion 30 at one end of an elongated shank 32 of pin 12. The pin 12 has an enlarged head 34 at the other end of pin shank 32. The pin shank 32 has a first smooth shank portion 36 of uniform diameter extending from head 34 to a relatively second smooth shank portion 38 of a smaller uniform diameter which leads to the threaded portion 30. The threaded portion 30 includes a splined pintail portion 40. The splined pintail portion 40 is formed with a plurality of axially extending splines 44 and in one form of the invention comprised a generally conventional twelve pointed splined construction. The pintail portion 40 is connected to the remainder of threaded portion 30 via an annular breakneck groove 46. The breakneck groove 46 is of a reduced cross-sectional area which is designed to fracture at a predetermined torque load at the conclusion of the installation cycle. The first shank portion 36 is of a diameter D1 which is larger than diameter D2 of second shank portion 38 whereby an annular stop shoulder 48 is defined. The shoulder 48 is located a preselected distance L1 from the pin head 34 and acts as a stop for a purpose to be described.

The expandable sleeve 16 is of a generally uniform tubular shape having generally uniform inside and outside diameters, with the inside diameter D3 being generally equal to the enlarged diameter D1 of the first shank portion 36 with a slight clearance to facilitate assembly. The expandable sleeve 16 has a generally uniform outside diameter D4. The expandable sleeve 16 is of a length L2 and is longer than the preselected distance L1 of shoulder 48 from the pin head 34 whereby it extends partially over second shank portion 38 by a distance Lχ As will be seen the distance Lχ is selected to be that length necessary to form a blind head to be described.

The main sleeve 18 has a generally uniform, tubular shape with an outer surface of generally constant maximum outside diameter D5 generally equal to the outside diameter D4 of expandable sleeve 16. The main sleeve 18 has a through bore of a generally uniform diameter D6 which is generally equal to the major diameter of the crests of the threaded portion 30 with a slight clearance to facilitate assembly. The diameter D2 of second shank portion 38 is generally equal to the roll or pitch diameter of the threaded portion 30; as will be noted, however, since the threads 28 will be of a relatively shallow root construction the diameter D2 of second shank portion 38 will be only slightly less than the major diameter of the threads 28 and hence of the bore diameter D6. At the same time, then, the bore diameter D6 of main sleeve 18 will be less than the bore diameter D3 of expandable sleeve 16. Thus the wall thickness t1 of the main sleeve 18 will be greater than the wall thickness t2 of expandable sleeve 16 by the radial depth d1 of shoulder 48.

In use of the fastener 10, the main sleeve 18 and pin shank 32 are adapted to be located in and extend through aligned openings or bores 50 and 52 in a pair of workpieces 54 and 56, respectively, with the outer surface 58 of workpiece 56 engaged by the load bearing surface 22 of the bearing washer 20. In this regard, the load bearing surface 22 has a sufficiently large effective bearing area to provide a desired distribution on the outer workpiece surface 58 of the installation loads as well as operating loads on the workpieces 54 and 56 after installation. In addition the opposite load bearing surface 23 fully engages the load bearing surface 65 of the nut 14 and provides a hard, wear resistance surface to resist the torque loads applied by the nut 14 as it rotates relative to the bearing washer 20. The outside diameters D4 and D5 of the expandable sleeve 16 and main sleeve 18, respectively, are selected to fit through the aligned openings 50 and 52 with a clearance fit. In this regard the diameter D7 of pin head 34 and the outside sleeve diameters D4 and D5 are generally the same, such that the assembly can be accepted through the openings 50 and 52 in a clearance relationship.

Looking now to the grip adjuster assembly 19, the resistance or shear washer component 24 is of a generally flat construction and has a central bore 60 of a reduced diameter adapted to receive the threaded shank portion 30 of pin 12 with a slight clearance fit. The bore 26 of the bearing washer 20 is of a uniform diameter and at the outer side of shear washer component 24 defines an enlarged outer grip cavity 64. The grip cavity 64 is enclosed at its outer end by the confronting, load bearing surface 65 of the nut 14. The bore 26 is of a diameter which is generally equal to the outside diameter D5 of the main sleeve 18 with a slight clearance to avoid frictional resistance to relative axial movement therebetween. The frangible shear washer component 24 is provided with a preselected thickness defining a shear section 66 of a selected width adapted to fracture at a preselected shear load relative to the periphery of the bore 26 resulting from the relative axial force between the pin 12 and main sleeve 18. The relatively close tolerance fits between the bore 60 of the shear washer 24 and threaded portion 30 of pin 12 maintain these components in general co-axial alignment and at the same time maintain the main sleeve 18 in coaxial alignment with the annular shear section 66 of shear washer 24. The axial depth d3 of the grip cavity 64 is selected to define the effective grip range of the fastener 10.

The fastener 10 is adapted to be set by torque applied between the pin 12 and nut 14 via the threaded engagement of nut 14 on the threaded shank portion 30. Looking now to FIGS. 2–4, the installation can be accomplished by a tool 68 of a construction generally known in the art and hence only a portion of the tool 68 is shown and the specific details thereof have been omitted for purposes of simplicity. The nut 14 has a conventional hexagonal outer surface 70 (see FIG. 1A) which is adapted to be drivingly engaged by a tubular socket like outer wrench member 72 having a hexagonally shaped radially inner surface 74 at its outer end configured to matingly receive the outer nut surface 70. (See FIG. 2) The tool 68 has a central socket member 76 which has a radially inner surface 78 at its outer end which is grooved to matingly receive the splines 44 defining the twelve pointed splined portion 40 of the pin 12. In one form of the tool 68, the central socket member 76 is resiliently biased axially forwardly to provide sufficient engagement with the splined portion 40. The outer wrench member 72 and central socket member 76 are adapted to be rotated relative to each other. Thus to install the fastener 10 the tool 68 is applied to the outer end of the fastener 10 with the outer wrench member 72 in engagement with the hexagonal nut surface 70 and with the central socket member 76 in engagement with the splined portion 40. When the tool 68 is actuated, the outer wrench member 72 is rotated relative to the central socket member 76 whereby the nut 14 is threaded further onto the threaded shank portion 30. Frequently, at the beginning of the installation cycle, the central socket member 76 will be rotated while the outer wrench member 72 will be held from rotation thus rotating the pin 12 and sleeves 16 and 18, as a unit, relative to the stationary nut 14 and bearing washer 20; as the components of the fastener 10 and the workpieces 54 and 56 are brought into increased loading relationship the nut 14 will be rotated while the pin 12, sleeves 16 and 18 and bearing washer 20 will be held stationary. In either event, as this occurs the core bolt or pin 12 moves axially relative to the nut 14. At the same time, the resilient, axial bias on the central socket member 76 permits it to be moved axially rearwardly to thus accommodate the additional axial movement of the pin 12 relative to the tool 68. In this way a relative axial force is developed between the pin 12 and the main sleeve 18 and expandable sleeve 16 by virtue of the torque applied by the tool 68 between the pin 12 and nut 14.

At the same time, as the pin 12 begins to move axially via the relative rotation with the nut 14, the applied relative axial force thus increases the column loading on the expandable sleeve 16 causing it to be bulbed or expanded radially outwardly to fully define a first blind head 80 of a bulbed configuration at a point spaced from the blind side surface 82 of inner workpiece 54. (See FIG. 2). As the relative axial force increases the frangible shear washer 24 fractures across the shear section 66 permitting the main sleeve 18 and expandable sleeve 16 with the fully formed blind bulbed head 80 to move generally freely axially relative to each other and relative to the load bearing surface 22 of bearing washer 20. In this condition, the blind bulbed head 80 will be moved into engagement with blind side surface 82 of the inner workpiece 54. (See FIG. 3).

The shear section 66 of the frangible washer 24 is selected to be of sufficient shear strength to accept the magnitude of relative axial force required to bulb the expandable sleeve 16 to form the bulbed head 80 and to thereafter sever permitting the forward end of the main sleeve 18 to move within the grip cavity 64 of the bearing washer 20. In one form of the invention the shear section 66 was provided to have a shear strength to shear at a magnitude of relative axial force between around 15% to around 25% higher than the axial force at which the bulbed head 80 is fully formed as shown in FIG. 2.

In order to avoid distortion to the bulbed head 80 and to assure shearing of the shear washer 24 at the desired load, the stop shoulder 48 on pin 12 is provided to engage the confronting end 86 of the main sleeve 18 after a preselected amount of movement which is sufficient to form the bulbed head 80 (see FIG. 2A). This movement is generally defined by the distance L$\chi$ (see FIG. 1). Thus any additional movement of the main sleeve 18 against the expandable sleeve 16 will be inhibited. At the same time any additional axial load applied to the expandable sleeve 16 after the bulbed head 80 has been formed will be substantially reduced or eliminated. This inhibits the application of excessive loads to the expandable sleeve 16 which could cause radial distortion of the end 92 engaged with confronting sleeve end 86; such distortion could result in the generation of high frictional forces against the workpiece bore 50. At the same time sufficient axial load is being developed through the main sleeve 18 to assure shearing of the shear washer 24.

The axial depth d3 of grip cavity 64 is selected to be greater than the distance L from the free end surface 84 of the blind head 80 of expandable sleeve 16 to the blind side surface 82 of workpiece 54 after the blind head 80 is fully formed as shown in FIG. 2. The distance L can vary depending upon the total thickness of the workpieces being secured together. In a minimum grip condition, i.e. workpieces 54 and 56 of minimum total thickness, the distance L will be at its maximum and hence the grip cavity depth d3 should be at least slightly greater than this maximum distance L to assure that the main sleeve 18 is removed from load bearing engagement with the expandable sleeve 16 before the free end surface 84 of bulbed head 80 engages the blind side surface 82 under all grip conditions within the grip range of the fastener 10. This assures that the end surface 84 of bulbed head 80 will be freely moved into engagement with the blind side surface 82 of workpiece 54 as shown in FIG. 3. As noted, with the main sleeve 18 out of load bearing engagement, the full magnitude of the relative axial load resulting from the torque between the nut 14 and core bolt or pin 12 is applied to the workpieces 54, 56 substantially solely between the nut 14 and the pin 12 via the pin head 34 and the bulbed head 80.

In order to optimize the strength of the blind head structure a double blind head construction is formed including a tuliped shaped blind head in combination with the bulbed blind head 80. Thus with the blind bulbed head 80 in engagement with the blind side surface 82 and with the main sleeve 18 out of load bearing engagement with the stop shoulder 48 the full torque load is again applied to the expandable sleeve 16 by the pin head 34. As this occurs and the relative axial load increases the surface 85 under the pin head 34 will begin to cut a ring 94 of material from the end 92 of the expandable sleeve 16 as the pin head 34 moves into the open end of the expandable sleeve 16 and expands that end of the sleeve 16 radially outwardly to form an enlarged tuliped head 96. See FIGS. 4 and 6. With this construction, the tuliped head 96 reinforces the bulbed head 80 whereby a combination blind head 98 of increased strength is formed.

In this condition the applied torque and resultant axial load is increased up to a preselected desired magnitude after which the breakneck groove 46 fractures whereby the pintail portion 40 is severed and the installation is completed as shown in FIG. 4. Thus the final desired clamp load as applied and attained by the set fastener 10 of FIG. 4 will not be affected by the main sleeve 18.

To promote the formation of the tuliped blind head 96, the underside surface 85 on the pin head 34 is tapered radially outwardly and axially forwardly. In one form of the invention the angle A of taper relative to a plane normal to the central axis X of the pin 12 was selected to be around 12.5 degrees (see FIG. 5). This configuration both enhances the tensile strength of the pin head 34 and assists in shearing the ring 94 and formation of the tuliped head 96. (See FIG. 6). At the same time, the engaging end 92 of the expandable sleeve 16d was formed to be radially in a plane generally at a right angle to the pin axis X.

It can be seen from FIG. 6 that the combination blind head 98 has an increased effective shear area relative to the bearing area of the inner surface 82 surrounding the bore 50 and the pin head 34. In this regard it should be noted that the tuliped head 96, including the ring 94, is essentially in load bearing relationship with the bulbed head 80 whereby they react as a unitary structure to loads applied to the workpieces 54, 56.

One of the objectives is to provide a high strength blind fastener with minimal blind side clearance B (see FIG. 1). In applications where the installed fastener is constructed to have only the single blind head, such as bulbed head 80, the overall length L2 of the expandable sleeve 16 could be somewhat less with initially less pre-installed blind side clearance B than the expandable sleeve 16 as provided to form the combination bulbed and tuliped blind head 98. However, the increase in length is relatively slight and will be of negligible consequence, if any, when installed since the pin head 34 will move partially into the end of the expandable sleeve 16 in forming the blind tuliped head 96. In any event, the additional length to expandable sleeve 16 will be maintained a minimum in order to reduce stresses from column loading and to thus inhibit bulbing from column loading and assuring formation of the tuliped blind head.

As noted, a principal objective of the present invention is to provide a blind fastener having very high strength characteristics in which conventional high strength bolts have been used. In addition to providing a blind head 80 which has a high strength, the materials of the fastener 10 are selected to be of high strength and hence high hardness. Thus the core bolt or pin 12 can be made of a high strength steel having a preselected desired hardness. In one form of the invention the pin 12 was made of an AISI 4140 alloy steel and having a Rockwell hardness of between around 35Rc to around 40Rc. The nut 14 can be made of the same material and in one form was made with a Rockwell hardness of between around 28Rc to around 34Rc.

At the same time the shear washer 24 was constructed of a similar material having a hardness to provide a brittle fracture across the shear section 66. In one form of the invention the shear washer 24 was constructed of an AISI 4140 alloy steel having a Rockwell hardness of between around 40Rc to around 46Rc.

The bearing washer 20 can also be constructed of a ferrous or other material such as a high carbon steel. In one form of the invention the bearing washer 20 was constructed of an AISI 4130 alloy steel having a Rockwell hardness of between around 39RC to around 44RC. With this construction, the formation of the grip adjuster structure or assembly 19 can be simplified and at the same time the materials of the bearing washer component 20 and frangible, shear washer 24 can be separately selected to optimize the performance of each.

In this regard the main sleeve 18 can be constructed of a medium carbon hardened steel while the expandable sleeve 16 can be constructed of a low carbon steel that is work hardened during formation by cold heading. In order to facilitate the formation of bulbed head 80 at a desired location, the expandable sleeve 16 is locally annealed in a band over a section generally indicated by the numeral 88 (see FIG. 1). The annealed section 88 is preferably located midway along the length of the expandable sleeve 16 in order to provide the formation of the bulbed blind head 80 in a column failure or collapsed mode at this mid location and at the same time to facilitate non-directional assembly onto the pin 12. In one form of the invention the main sleeve 18 was constructed of a medium carbon steel having a Rockwell hardness of between around 43Rc to around 47Rc. The expandable sleeve 16 was constructed of an AISI 1018 steel having a Rockwell hardness of between around 85Rb to around 95Rb with the annealed section 88 being annealed over a gradient to a minimum Rockwell hardness of around 60Rb. Thus, with pin head 34 being of substantially higher strength than the expandable sleeve 16, the angle A (see FIG. 5) of tapered surface 85 can be selected relative to the form of the expandable sleeve 16 at the engaging end to facilitate cutting of the ring 94 and formation of the tuliped head 96.

In one embodiment of the invention for a nominal 24 mm (0.96 inches) diameter size fastener 10 of the above noted materials and construction, the expandable sleeve 16 was made with an outside, nominal diameter D4 of 24 mm (0.96 inches) and an inside diameter D3 of 18.8 mm (0.742 inches). The overall length L2 of sleeve 16 was 43 mm (1.70 inches) with the band annealed or softened section 88 provided midway along the length L2. With such a construction the desirable combination blind head 98 was formed including the bulbed head 80 and tuliped head 96. In this regard it is believed that the location of the band annealed or softened section 88 should not vary by more than approximately 6.4 mm (0.25 inches) from the midpoint (0.5×L2) of the length L2 of the expandable sleeve 16. At the same time, even with the softened section 88 located at the midpoint (0.5×L2) of the sleeve 16, the overall length L2 of the sleeve 16, for the construction noted above, should preferably not be less than around 36 mm (1.425 inches). At the same time the length L2 should not appreciably exceed the length noted for the sleeve 16 constructed as indicated above. The specific dimensions for expandable sleeves 16 for fasteners 10 with different nominal diameters and/or different materials can be determined accordingly.

It should be noted that in some applications the sleeves 16 and 18 could be combined in a one piece construction, see U.S. Pat. No. 5,213,460 supra.

As noted, the weakest portion of the pin shank 32 is at the breakneck groove 46 which defines the smallest effective diameter or cross sectional area on the pin shank 32. In order to maximize the clamp load capability of fastener 10 and to attain higher load levels such as with bolts meeting ASTM A325 or Japanese F8T specifications, it may be desirable to maximize the diameter and hence strength of the breakneck groove 46. In prior constructions however, this has been limited by the necessity of creating a splined portion (such as splined portion 40) of a maximum diameter less than the internal, minor diameter of the threads of the nut (such as nut 14) in order to permit the nut to move freely over the splined portion and into threaded engagement with the adjoining threaded portion of the pin shank. In such prior constructions the crests or points of the splines are required to be of a diameter less than the root diameter on the threads of the pin and thus the root of the splines essentially defines a minimum diameter which is less than the root diameter of the pin threads, see U.S. Pat. No. 5,213,460, supra. In the present invention, the original blank diameter of the threaded portion 30 and the blank diameter of the splined portion 40 are the same diameter as the diameter D2 of the pin shank portion 38. The twelve point splined portion 40 can be cold formed in the cold heading process on the pin blank for forming the pin 12. The thread portion 30 can be cold rolled over the splined portion 40 at the same time to form the continuous thread form. Alternatively the splines can be formed by cutting the spline grooves on the end portion of the pin blank which is of the same diameter as the adjoining portion of the blank. Next the thread can be formed by rolling over the splined end portion and on to the adjoining portion of the blank. The result will be a continuous thread form over the splined end portion 40 and the adjoining threaded section of the threaded portion 30. With any of the preceding constructions, the breakneck groove 46 can then be cut into the threaded portion 30 at the desired location and to the desired depth. In still another form, the splines could be cut after the thread form has been rolled into the end portion. In the latter case the breakneck groove 46 will act as a relief groove between the splined portion 40 and adjacent threads to facilitate machining or broaching of the splines.

With the unique constructions as defined above the nut 14 can be threaded onto non-splined section of the threaded portion 30 by first being threaded over the threaded, splined portion 40. In this way the radial depth of the splines 44 can be set to provide the desired strength while maintaining the minor diameter Dr of the root of the splines at a maximum (See FIGS. 1 and 1A). At the same time the crests or points of the splines 44 can be at a major diameter equal to or slightly less than the major or crest diameter of the threads 28. With this construction the strength of the breakneck groove 46 can be maximized by forming it to a diameter generally slightly less than the minor or root diameter Dr of the splines 44. At the same time, this maximized spline diameter feature allows use of a conventional tool having the same internal, central wrench socket member 76 and the same external hex socket member 72 as are used on existing, conventional tension control, non-blind splined bolts for the same hole diameter.

In this regard, it should be noted that the conventional, non-blind tension control bolt fasteners generally include only a bolt and a nut and possibly a bearing washer. Thus for securing different workpieces having generally the same hole diameter, the bolt member of the tension control bolt (non-blind) fastener will have a diameter generally equal to the outside diameter D4, D5 of the sleeves 16 and 18 of the subject blind fastener 10. Thus the bolt of the conventional non-blind fastener will be of a larger diameter than the pin 12 of the present blind fastener. The unique splined pintail portion 40, however, being of a maximum diameter relative to the diameter of pin 12 will be constructed to be of the same diameter as the conventional reduced diameter splined portion on the tension control bolt. At the same time, the nut 14 will have a smaller threaded bore 29 than the threaded bore of the nut for the tension controlled bolt. However, the hexagonal outer surface 70 of nut 14 for the blind fastener 10 is constructed to be of the same size and shape as that of the nut for the conventional non-blind tension control bolt. Thus, since the splined portions on the bolt of the conventional non-blind fastener and the pin 12 of the present blind fastener 10 are of the same diameter and same spline configuration and the nut members have the same sized and shaped hexagonal outer surfaces, the same installation tool 68 can be used to install either type fastener for application in workpiece holes generally of the same diameter. One such conventional tool which can be used interchangeably on a conventional non-blind fastener and the present unique blind fastener 10 is manufactured by Maeda Metal Industries of Japan and sold under the trademark TONE with one model size being S-90EZ.

It should be noted that the expandable sleeve 16, can be provided to be of a minimum length L2 sufficient to assure that the blind bulbed head 80 is formed generally uniformly to the desired final diameter while also permitting formation of the blind tuliped head 96. Thus an expandable sleeve 16 of minimum length can accommodate the entire grip range which as noted can be selected to be large. At the same time the blind bulbed head 80 will be of a relatively large, constant diameter regardless of the grip thereby providing for a large bearing area against the blind side surface 82. The large diameter blind bulbed head 80 also permits use of the fastener 10 in applications where there is a relatively large clearance between the workpiece openings 50 and 52 and the expandable sleeve 16.

Note that with the construction as shown in FIGS. 1–4 a single expandable sleeve 16 could be used with a number of different lengths of fasteners such as fastener 10, i.e. longer or shorter pins 12 and main sleeves 18. In addition the feature of forming the blind bulbed head 80 in air and spaced from the rear workpiece surface 82 (see FIG. 2) results in a uniform back-side protrusion throughout the grip range (see FIGS. 3 and 4).

The number of threads of nut 14 engaged with the threaded pin shank portion 30 in full, final engagement is selected to be sufficient to provide the desired high level of clamp up of the workpieces 54 and 56 and to resist the maximum design tensile load on the resultant joint. Thus the nut height or width H of nut 14 is selected to be sufficient to provide the necessary number of threads to withstand these loads on full thread engagement (see FIG. 1). At the same time the length of the threaded pin shank portion 30 is selected to provide full thread engagement with the threads of nut 14 over the entire grip range of the fastener 10 while providing the minimum protruding length B" after installation. (See FIG. 4). In this way the overall length of the fastener 10 can be minimized in both the installed and uninstalled conditions.

Note that the main sleeve 18 can have a wall thickness which can be maximized for the diameter of the threaded portion 30 of the pin 12 and the diameter of the workpiece bores 50, 52. Thus the column strength of the main sleeve 18 can be maximized for a given sized fastener 10 and workpiece bores 50, 52. In this regard the extra wall thickness of the main sleeve 18 relative to that of the expandable sleeve 16 as permitted by the stepped construction of pin shank portions 36 and 38 will provide a further increase in its column strength. At the same time the shear load of the frangible washer component 24 can be readily adjusted simply by selection of the thickness of the shear section 66 and by selection of the strength and hence shear strength of the material of the frangible washer 24. In this way the expandable sleeve 16 can be selected to be of a higher strength construction and material requiring a higher load for creating the blind bulbed head 80. The result will be a fastener having a generally greater overall strength.

In addition it can be seen that the expandable sleeve 16 and main sleeve 18 after installation of the fastener 10 will define generally continuous axially extending surfaces for engagement with the confronting surfaces of workpiece bores 50 and 52. In this way the integrity of the joint can be improved since there will be essentially minimal gaps between the surfaces of the workpiece bores 50 and 52 and the expandable sleeve 16 and main sleeve 18.

In order to minimize the installation torque loads and thus assist in the proper functioning of the fastener components and the consistent, proper installation of the fastener, a high quality, baked on dry film lubricant such as molydisulphide has been found desirable on the pin 12 and on all surfaces of the bearing washer component 20 to reduce friction between the moving parts of fastener 10. A molydisulphide lubricant such as Kalgard FA manufactured by Kalgard Corporation has been found to be satisfactory.

An electro-zinc corrosion resistant plating and wax type lubricant such as paraffin are also desired on the nut 14. The expandable sleeve 16, the main sleeve 18 and the shear washer 24 are not lubricated and/or coated; however, the expandable sleeve 16 in some cases may be plated similarly to the nut 14. Thus, in the steps of forming the bulb on expandable sleeve 16 and in shearing the shear washer 24 there is substantially no relative rotation between the core bolt or pin 12 and the expandable sleeve 16 or between the expandable sleeve 16 and the main sleeve 18. Excessive relative rotation between these pin and sleeve components could generate frictional heating of the sleeve ends 86, 92 sufficient to produce swelling of the sleeve ends 86, 92 that might inhibit proper installation of the fastener. Thus with the above construction such relative rotation is inhibited and the pin and sleeve components can rotate as a unit with the pin 12 while the bearing washer component 20 and the nut 14 are stationary. When the shear washer 24 shears and the bulbed head 80 on sleeve 16 moves to the rear surface 82 of workpiece 54 the developing clamp load causes pin 12, expandable sleeve 16 and main sleeve 18 to stop rotation and further clamp load is developed between the workpieces 54, 56 by rotation of the nut 14 alone relative to the pin 12 and against the stationary bearing washer 20. As noted, here the engaging surfaces and engaged threads are lubricated whereby friction is minimized.

In some applications, in addition to the coating and/or plating applied to the pin 12, nut 14 and bearing washer 20, it may be desirable to apply an anti-corrosion oil to the expandable sleeve 16, main sleeve 18 and shear washer 24. One type of anti-corrosion oil can be an oil sold under the trade name LANACOTE by Amrep, Inc. In this case, however, because of the lubricity added by the anti-corrosion oil and in order to inhibit the unwanted relative rotation discussed above, the engaging surfaces are roughened such as by knurling or serrating. Thus in such cases the opposite end surfaces 86 of main sleeve 18 and opposite end surfaces 92 of expandable sleeve 16 are roughened. In addition the underside surface 85 of pin 12 can be similarly roughened. This can be done during heading of these components. In this way the unwanted, relative rotation between components can be precluded.

It is important that the axis of main sleeve 18 be maintained in substantial coaxial alignment with the axis X of the pin 12 during the installation cycle. By providing the major diameter of the threaded portion 30 to be close to the diameter of the bore 60 through shear washer 24 such alignment will be essentially assured. Similarly the generally close fit between the central bore 60 of shear washer 24 and threaded shank portion 30 along with the generally snug fit of shear washer 24 in counterbore 27 in bearing washer 20 assists in providing the desired alignment between main sleeve 18, shear section 66 and bearing washer bore 26.

With the use of high strength, high hardness materials, it is desirable to reduce the stress concentrations such as that at the juncture between the inner surface 85 of the pin head 34 and smooth shank portion 36 (see FIG. 5). This is accomplished by providing a generally streamlined shape to the arcuate fillet 71 located at that juncture. It should also be noted that the opposite end surfaces 92 of the expandable sleeve 16 are generally planar and extend substantially at right angles to the pin axis X. At the same time chamfers 59 are provided on the inside diameter at the opposite ends 92 of expandable sleeve 16. The chamfers 59 plus the radially inner clearance between under surface 85 of pin head 34 and sleeve end surface 92 assures that the confronting end 92 of expandable sleeve 16 will not engage the fillet 71. In this regard, the chamfers 59, which also assist assembly, are similarly located on both ends of the expandable sleeve 16 to provide a symmetrical structure to preclude the need for any special orientation of sleeve 16 as it is assembled onto pin 12. At the same time opposite end surfaces 86 of main sleeve 18 are generally planar and extend substantially at right angles to the pin axis X.

In addition the planar end surfaces 92 and 86 of sleeves 16 and 18, respectively, will provide good bearing surfaces against each other. In this regard planar surface 86 of main sleeve 18 also provides a good bearing surface against the shear washer 24.

In addition to the reduction of the stress concentrations, as noted, it is desirable to reduce stress concentrations between mating threads. Thus the threads 28 of the threaded shank portion 30 are formed to be generally shallow in depth and to have roots of a generally streamlined contour. Thus, in one embodiment, the threads 28 could utilize the groove shape and concepts of U.S. Pat. No. 5,090,852 issued Feb. 25, 1992 to Dixon. With this root construction, the stress concentration at the threads 28 is also reduced.

As noted in the '852 Dixon patent, the threads 28 can be of a shallow helical construction with a generally streamlined shape whereby a high strength joint construction can be achieved having a desirable high clamp load. With the noted shallow thread structure, a close tolerance fit with the threads of the nut 14 is desirable. In one form of the invention a Class 3 thread fit was utilized. Thus with a major diameter of 0.612 inches on the threads 28 of the pin shank portion 30, a major diameter of 0.618 inches was used on the mating threads of the nut 14.

As noted it is desirable that the high strength fastener of the present invention provide a high final clamp load to the fastened joint. To achieve this result high installation loads including final pin break load at breakneck groove 46 are required from the installation tool 68. These loads, however, are applied by torque and hence are generally absorbed by the tool 68 and are essentially not transmitted to the operator handling the installation tool 68. Thus the high load occurring at pin break at breakneck groove 46 is substantially absorbed by the tool 68 by virtue of the torque application to the fastener 10. The magnitude of installation torque required by the installation tool 68 can be substantially reduced by use of the selective lubrication previously discussed such that the rotational speed of the final output of the tool 68 can be increased whereby the time required for installation can be significantly reduced.

One of the advantages of the use of a minimum length L2 of the expandable sleeve 16 is a significant reduction in blind side clearance B (see FIG. 1). Also the final installed blind side clearance B' can be minimized (see FIG. 4). At the same time the final blind side clearance B' will be uniform over the extended grip range of the fastener 10 since, as noted, the blind bulbed head 80 is formed uniformly away from the back surface 82 of workpiece 54 (see FIG. 2).

A modified form of the grip adjuster construction of FIGS. 1–6 is depicted in the views of FIGS. 7 and 8 where components similar to like components in the embodiment of FIGS. 1–6 are given the same numeral designation with the addition of the letter postscript "a"; unless described otherwise similarly numbered components shall be considered similar in construction and to function in a manner similar to that as previously described and hence a description of such similar components shall not necessarily be given.

In many applications with threaded fasteners it is desirable, after installation, to be able to remove the fastener by unthreading the nut from the bolt or in some cases to retighten the joint by applying additional torque between the nut and bolt. In certain applications, however, the initial breakaway torque for removal can be quite high such that when applying a wrench only to the nut (such as nut 14) for removal or retightening, both the nut and associated pin or bolt will turn together making threaded removal or retightening somewhat difficult if not impossible. In the form of the present invention shown in FIGS. 7 and 8, a unique construction is provided for permitting separate gripping of the pin and nut for the application of torque thereby facilitating removal or retightening.

As can be seen from FIGS. 7 and 8, the splined portion of threaded portion 30a is extended inwardly past the breakneck groove 46a to define a secondary splined portion 87. Thus upon final installation and removal of the splined pintail portion 40a by fracturing of the breakneck groove 46a the secondary splined portion 87 will remain at the free end of the pin 12a (see FIG. 8). This secondary splined portion 87 is selected to be of sufficient length so that in the maximum grip condition it will extend past the outer end of the nut 14a far enough to be engaged by a grooved socket member (such as central socket member 76a on tool 68a) whereby the pin 12a can be held stationary while removal or tightening torque is applied to the nut 14a via a hexagonal socket member (such as hex socket member 72a on tool 68a). The minimum protrusion of the secondary splined portion 87 beyond the outer end of the nut 14a would occur in a maximum grip condition, i.e. workpieces 54a, 56a of a maximum total thickness within the grip range of fastener 10a. At the same time the maximum protrusion of the secondary splined portion 87 beyond the outer end of the nut 14a would occur in the minimum grip condition, i.e. workpieces 54a, 56a of a minimum total thickness within the grip range of fastener 10a. It is desirable to maintain the protrusion to be as short as possible. This is done by first determining the length of secondary spline portion 87 required to provide sufficient engagement with a mating socket member to withstand the removal torque in a maximum grip condition. With this set as short as possible, the maximum protrusion of the secondary splined portion 87, in the minimum grip condition, would be a distance equal to the grip length d3a plus the preselected length of protrusion determined adequate for the maximum grip condition.

As with the embodiment of FIGS. 1–4, the embodiment of FIGS. 7 and 8 is constructed to form a combination blind head 98a including both a blind bulbed head 80a and a blind tuliped head 96a.

A modified form of grip adjuster is shown in FIG. 9. In the description of the embodiment of FIG. 9 components similar to like components in the embodiment of FIGS. 1–6 have been given the same numeral designations with the addition of the letter postscript "b"; unless described otherwise similarly numbered components shall be considered similar in construction and to function in a manner similar to that as previously described and hence a description of such similar components shall not necessarily be given.

Looking now to FIG. 9, the fastener 10b has a grip adjuster construction or assembly 19b which is defined by a combined bearing and shear washer component 20b which is of a one piece construction. The washer component 20b has load bearing surfaces 22b and 23b. The bearing-shear washer 20b has a central, reduced diameter bore 60b of a diameter adapted to receive the threaded shank portion 30b of the pin 12b with a slight clearance fit. The associated nut 14b has a counterbore 104 formed at its engaging end surface 65b whereby a grip cavity 64b is defined. The grip cavity 64b is blocked at its outer end by the confronting surface 23b of the bearing-shear washer component 20b. The counterbore 104 is of a diameter which is generally equal to the outside diameter of the main sleeve 18b and both are sized to provide a slight clearance to avoid frictional resistance to relative axial movement therebetween. The bearing-shear washer 20b is provided with a uniform preselected thickness defining a shear section 66b of a selected width adapted to fracture at a preselected shear load resulting from the relative axial force between the pin 12b and main sleeve 18b. The relatively close tolerance fit between the bore 60b of the washer 20b and threaded portion 30b maintains these components in general co-axial alignment and at the same time maintains the main sleeve 18b in coaxial alignment with the annular shear section 66b. The axial depth d3b of the grip cavity 64b is selected to define the effective grip range of the fastener 10b. The pin 12b is provided with a conventional, splined portion 100 at its outer end. The splined portion 100 can be of the twelve point splined construction with the major or crest diameter of the splines being less than the root or minor diameter of the threads of threaded portion 30b. Thus the splined portion 100 does not have the unique threaded spline construction of the prior embodiments discussed. In view of the generally reduced strength of the smaller diameter splined portion 100 the associated expansion sleeve could be configured whereby only a single blind head of the bulbed configuration (such as blind bulbed head 80) is formed. At the same time while the height of the nut 14b may be increased to provide for the counterbore 104, the maximum thickness of the bearing-shear washer 20b will be reduced resulting in an overall, combined thickness of nut 14b and bearing washer 20b generally proximate to that of the embodiment of FIGS. 1–6.

A modified form of grip adjuster of a one piece construction is shown in FIG. 10. In the description of the embodiment of FIG. 10 components similar to like components in the embodiment of FIGS. 1–6 have been given the same numeral designations with the addition of the letter postscript "c"; unless described otherwise similarly numbered components shall be considered similar in construction and to function in a manner similar to that as previously described and hence a description of such similar components shall not necessarily be given.

Looking now to FIG. 10, a one piece grip adjuster construction 19c is defined by a combined bearing and shear washer structure 20c. The washer 20c has inner and outer load bearing surfaces 22c and 23c, respectively. Inner bearing surface 22c is adapted to engage an outer workpiece surface such as surface 58 in FIG. 1 and outer bearing surface 23c is adapted to engage the bearing surface 65 of a nut 14 such as shown in FIG. 1. Thus the bearing-shear washer 20c in assembly relation with other components of a fastener 10 as shown in FIG. 1 could be used in place of the grip adjuster assembly 19 as defined by the bearing washer 20 and shear washer 24. The bearing-shear washer 20c has a central, reduced diameter bore 60c of a diameter adapted to receive the threaded shank portion of the associated pin (such as pin 12) with a slight clearance fit. A counterbore 26c formed at its outer end defines a grip cavity 64c. The grip cavity 64c will be blocked at its outer end by the confronting surface of the associated nut (such as nut 14). The axial depth d3c of the grip cavity 64c is selected to define the effective grip range of the fastener. The counterbore 26c is of a diameter which is generally equal to the outside diameter of the associated main sleeve (such as main sleeve 18) with a slight clearance to avoid frictional resistance to relative axial movement. The bearing-shear washer 20c is provided with a shear rib 24c of a preselected thickness defining a shear section 66c of a selected width adapted to fracture at a preselected shear load resulting from the relative axial force between the associated pin and main sleeve. Thus the grip adjuster 19c as defined by the one piece bearing-shear washer 20c will function in a manner similar to that of the grip adjuster 19 assembly as defined by the bearing washer 20 and shear washer 24.

Figure 11:
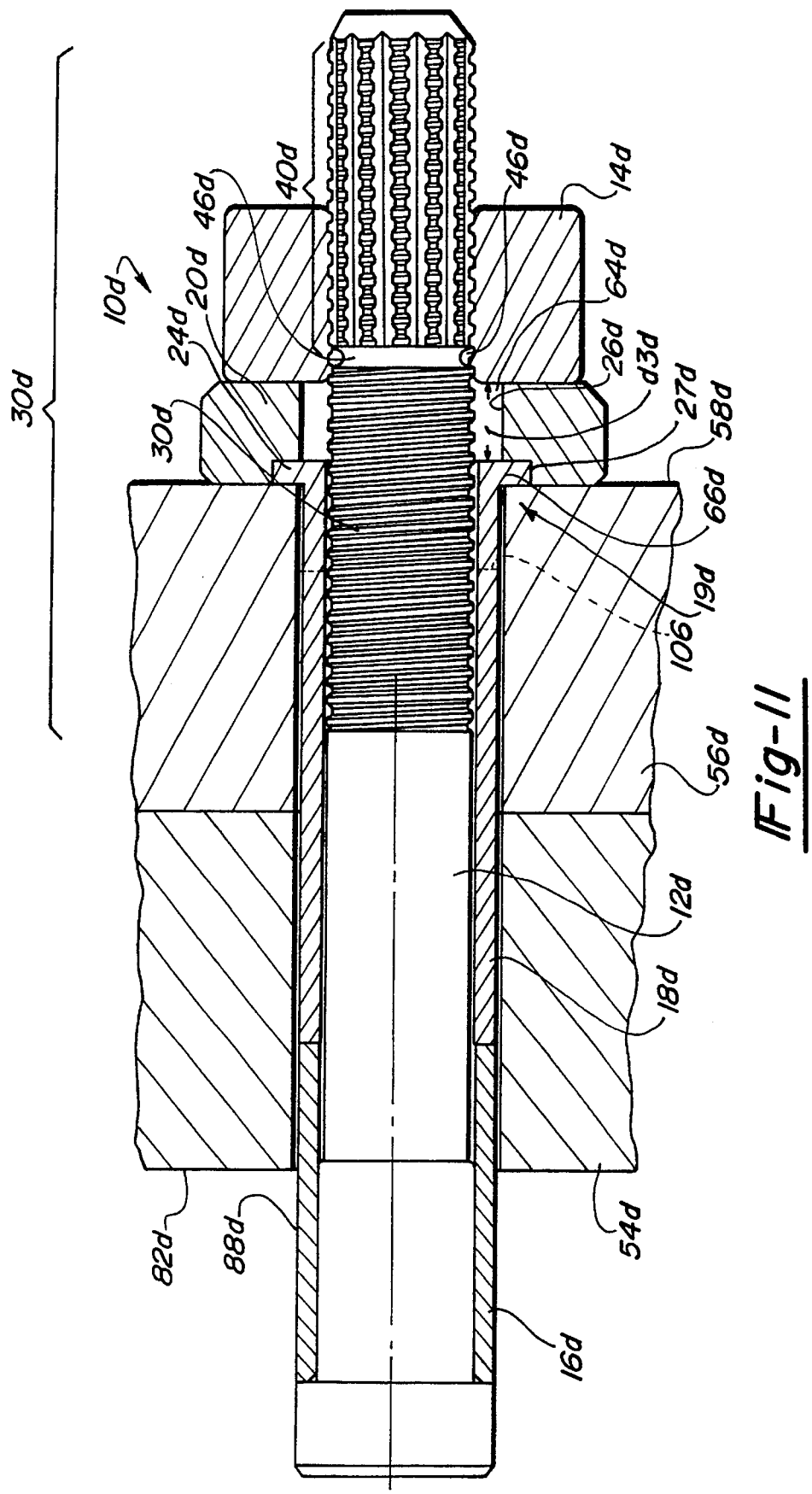
FIG. 11 is a sectional view of a blind fastener including another form of grip adjuster construction.

Another modification of the grip adjuster is depicted in FIG. 11 which is similar to the embodiment of FIGS. 1–6 therefore components in the embodiment of FIG. 11 similar to like components in the embodiment of FIGS. 1–6 have been given the same numeral designation with the addition of the letter postscript "d". Unless described otherwise similarly numbered components are of similar construction and function in a similar manner as previously described.

Looking to FIG. 11, it can be seen that the essential difference between the fastener 10d and fastener 10 of FIGS. 1–6 is the construction of the main sleeve 18d to be provided with an integral flange in place of the separate frangible shear washer component 24 of fastener 10. Thus the fastener 10d includes a core bolt or pin 12d, an annular nut 14d, an expandable sleeve 16d and a main sleeve 18d. Here the grip adjuster construction 19d is defined by a load bearing washer 20d and a frangible flange 24d formed integrally with the main sleeve 18d at its outer end. The bearing washer 20d has a central through bore 26d with an enlarged counterbore 27d at its inner end. At the same time, the flange 24d is of a diameter to be snugly received within the counterbore 27d in bearing washer 20d. The pin 12d, expandable sleeve 16d and nut 14d are essentially the same as their similarly numbered counterparts in FIGS. 1–6 and function in a manner similar to that as previously described. The nut 14d is adapted to be threaded onto a threaded portion 30d at one end of an elongated shank of pin 12d. The threaded portion 30d includes a splined pintail portion 40d. The threaded and splined pintail portion 40d is connected to the remainder of threaded portion 30d via an annular breakneck groove 46d.

The bore 26d of the bearing washer 20d is of a uniform diameter and at the outer side of frangible flange 24d defines an enlarged outer grip cavity 64d. The frangible flange 24d is provided with a preselected uniform thickness defining a shear section 66d of a selected width adapted to fracture at a preselected shear load relative to the periphery of the bore 26d resulting from the relative axial force applied to the main sleeve 18d and the flange 24d. The axial depth d3d of the grip cavity 64d is selected to define the effective grip range of the fastener 10d. As can be seen, by use of the integral, one-piece structure with the main sleeve 18d and flange 24d, alignment of the shear section 66d and the load bearing portion of main sleeve 18d will be positively fixed.

Thus the fastener 10d will be set by torque applied between the pin 12d and nut 14d via the threaded engagement of nut 14d on the threaded shank portion 30d. The shear section 66d of the frangible flange 24d is selected to be of sufficient shear strength to accept the magnitude of relative axial force required to bulb the expandable sleeve 16d to form a bulbed blind head, such as bulbed head 80, and to thereafter sever permitting the forward remaining end of the main sleeve 18d to move within the grip cavity 64d of the bearing washer 20d and to thereby permit the main sleeve 18d to move out of load bearing engagement with the expandable sleeve 16d. The installation can be accomplished by a tool such as tool 68 to set the fastener 10d in the same manner as shown in FIGS. 1–4 for the fastener 10. In this regard a combination tuliped and bulbed blind head such as the blind head 98 of FIG. 4 can be formed.

Alternatively a two piece construction could be used in place of the integral structure of the main sleeve 18d with flange 24d. Thus a separate sleeve member could be formed to include the flange 24b with the separate member terminating generally at a point indicated by the dashed line 106. With such a two piece construction a separate sleeve member containing the flange 24b of uniform size and shape could be made to function with fasteners having different grip ranges.

It should be noted that various features of the different embodiments can be interchanged. Thus the different threaded spline constructions can be used in the various embodiments; the same is true of the various grip adjusters, the combination bulbed and tuliped blind head and other features. In addition with each of the embodiments shown, it can be seen that for fasteners of the same diameter for use in different grip ranges literally only the pin and main sleeve need be changed to accommodate the required changes in length of the fasteners. This feature simplifies the manufacture and inventory requirements of the fastener components.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head;

said pin shank having a securing portion comprising a plurality of securing grooves, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, engaging means operatively connected with said sleeve means and including an engaging structure adapted to be engaged by the installation tool whereby the relative axial force can be applied by the installation tool between said pin member and said engaging means to clamp the workpieces together at a relative axial force of a first magnitude, said second sleeve shank portion being radially deformable at a location between said pin head and the blind side surface of the workpieces in response to the relative axial force of a second magnitude less than said first magnitude to form an enlarged blind head for reacting against the blind side surface, said sleeve means including load bearing means for transmitting the relative axial force of said second magnitude to said second sleeve shank portion through said first sleeve shank portion and responsive to a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said load bearing means adapted to be located generally externally of the aligned openings at the accessible side surface of the workpieces, securing means on said pin shank, said engaging means including an engaging structure operable with said securing means for connecting said pin member and said engaging structure together.

2. The blind bolt of claim 1 with said load bearing means comprising a load bearing member having one side adapted to be in load bearing relationship with the accessible side surface of the workpieces.

3. The blind bolt of claim 1 with said expandable sleeve structure having a weakened portion adapted to fold radially outwardly to form said blind head in a bulb form in response to the relative axial force of said second magnitude.

4. The blind bolt of claim 1 with said first sleeve shank portion and said second sleeve shank portion being separate members, said second sleeve shank portion having a weakened portion adapted to fold radially outwardly to form said blind head in a bulb form in response to the relative axial force of said second magnitude.

5. The blind bolt of claim 1 with said securing means including securing grooves on said pin shank being defined by a helical thread form, said engaging structure having a mating thread form adapted to be threadably engaged with said securing grooves whereby the relative axial force between said pin member and said engaging means is provided by the relative torque applied between said pin member and said engaging structure.

6. The blind bolt of claim 1 with said first sleeve shank portion being a main sleeve structure having a first through bore adapted to receive said pin shank, said main sleeve structure having a first end, said second sleeve shank portion being an expandable sleeve structure having a second through bore adapted to receive said pin shank, said expandable sleeve structure having a second end adapted to be in load bearing connection with said first end, said expandable sleeve structure having a portion axially spaced from said second end and adapted to be moved radially outwardly by the relative axial force through said main sleeve structure to form said blind head in response to the relative axial force of said second magnitude, stop means on said pin shank at a preselected location for engagement, by a first surface on said first end of said main sleeve structure after said blind head has been fully formed and while said first and second ends are in load bearing connection whereby the application of additional relative axial force to said expandable sleeve structure by said main sleeve structure above said second magnitude is resisted.

7. The blind bolt of claim 6 with said main sleeve structure and said expandable sleeve structure being separate members, said stop means comprising an enlarged diameter shoulder extending radially outwardly from said pin shank and being engageable with said first surface of said first end of said main sleeve structure.

8. The blind bolt of claim 1 with said securing means including securing grooves on said pin shank being defined by a helical thread form, said engaging structure being a nut member having a mating thread form adapted to be threadably engaged with said securing grooves whereby the relative axial force between said pin member and said nut member is provided by the relative torque applied between said pin member and said nut member, said pin shank having a splined end portion adapted to be engaged by the installation tool whereby torque can be applied between said pin member and said nut member, said splined end portion having a plurality of axially extending pointed splines defined by ridges extending radially from spline roots, said splines being generally uniformly circumferentially distributed with a plurality of said splines located in each quadrant around said end portion, said helical thread form extending across said splined end portion with the major and minor diameters of said spline ridges and roots being substantially the same as and compatible with the major and minor diameters of said helical thread form of said threaded portion whereby said nut member can be threaded thereacross.

9. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head;

said pin shank having a securing portion comprising a plurality of securing grooves, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, engaging means operatively connected with said sleeve means and including an engaging structure adapted to be engaged by the installation tool whereby the relative axial force can be applied by the installation tool between said pin member and said engaging means to clamp the workpieces together at a relative axial force of a first magnitude, said second sleeve portion being radially deformable at a location between said pin head and the blind side surface of the workpieces in response to the relative axial force of a second magnitude less than said first magnitude to form an enlarged blind head for reacting against the blind side surface, said sleeve means including collapsible means adapted to collapse at a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said collapsible means adapted to be located generally externally of the aligned openings at the accessible side surface of the workpieces, securing means on said pin shank, said engaging means including an engaging structure operable with said securing means for connecting said pin member and said engaging structure together, said collapsible means including a load bearing member adapted to be in load bearing relationship with the accessible side surface of the workpieces and a frangible structure operatively connected with said load bearing member, said load bearing member having a generally axially extending receiving bore adapted to receive said first sleeve shank portion, said frangible structure being supported by said load bearing member in a position partially blocking said receiving bore, said frangible structure being engageable by the outer end of said first sleeve shank portion and having a preselected shear area adapted to shear upon application of said third magnitude of relative axial force whereby said first sleeve shank portion can move axially into said receiving bore.

10. The blind bolt of claim 9 with said load bearing member and said frangible structure being defined in an integral, one piece structure.

11. The blind bolt of claim 10 with said frangible structure located at the inner end of said load bearing member, the portion of said receiving bore extending from said frangible structure to the outer end of said load bearing member defining a grip cavity of preselected length generally equal to the grip range of the fastener where the grip range is defined as the difference between the minimum and maximum total thickness of the workpieces that a single fastener can secure together.

12. The blind bolt of claim 9 with the portion of said receiving bore extending from said frangible structure to the outer end of said load bearing member defining a grip cavity of preselected length generally equal to the grip range of the fastener, where the grip range is defined as the difference between the minimum and maximum total thickness of the workpieces that a single fastener can secure together.

13. The blind bolt of claim 9 with said load bearing member and said frangible structure being separate members with said frangible structure being supported by said load bearing member.

14. The blind bolt of claim 13 with said frangible structure located in a counterbore at the inner end of said receiving bore.

15. The blind bolt of claim 14 with the portion of said receiving bore extending from said frangible structure to the outer end of said load bearing member defining a grip cavity of preselected length generally equal to the grip range of the fastener, where the grip range is defined as the difference between the minimum and maximum total thickness of the workpieces that a single fastener can secure together.

16. The blind bolt of claim 9 with said load bearing member including said engaging structure and having a through bore with a counterbored portion with said counterbored portion adapted to be in confrontation with said frangible structure and being of a size adapted to receive that portion of said frangible structure is sheared by the relative axial force of said third magnitude.

17. The blind bolt of claim 16 with said counterbored portion adapted to receive said outer end of said first sleeve shank portion and having an axial length defining a grip cavity of preselected length generally equal to the grip range of the fastener where the grip range is defined as the difference between the minimum and maximum total thickness of the workpieces that a single fastener can secure together.

18. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head;

said pin shank having a securing portion comprising a plurality of securing grooves, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, engaging means operatively connected with said sleeve means and including an engaging structure adapted to be engaged by the installation tool whereby the relative axial force can be applied by the installation tool between said pin member and said engaging means to clamp the workpieces together at a relative axial force of a first magnitude, said second sleeve portion being radially deformable at a location between said pin head and the blind side surface of the workpieces in response to the relative axial force of a second magnitude less than said first magnitude to form an enlarged blind head for reacting against the blind side surface, said sleeve means including load bearing means for transmitting the relative axial force of said second magnitude to said second sleeve shank portion through said first sleeve shank portion and responsive to a third magnitude of relative axial force less than said first magnitude and greater than said second magnitude with said first sleeve shank portion moving out of an axial load bearing relationship with said pin head whereby said blind head will engage the blind side surface such that said first magnitude of relative axial force and the final clamp load applied to the workpieces will be substantially between said pin, said blind head and said engaging means, said load bearing means adapted to be located generally externally of the aligned openings at the accessible side surface of the workpieces, securing means on said pin shank, said engaging means including an engaging structure operable with said securing means for connecting said pin member and said engaging structure together, said second sleeve shank portion being an expandable sleeve structure separate from said first sleeve shank portion and having a weakened portion adapted to fold radially outwardly to form said blind head with a bulb portion formed in response to the relative axial force of said second magnitude, said expandable sleeve structure including said weakened portion having a continuous, radial cross-section of connected material, said expandable sleeve structure having a first through bore adapted to receive said pin shank, said pin head adapted to move into said first through bore to radially outwardly expand that end of said expandable sleeve structure whereby said blind head includes a tulip shaped portion adjacent to said bulb formed portion, said pin head having a radially outwardly extending inner surface tapering radially outwardly and axially in a direction away from said pin head thereby defining an inner tapered surface, said expandable sleeve structure having an outer diameter generally equal to that of said inner tapered surface whereby said inner tapered surface abuts the confronting surface of said expandable sleeve structure, said inner tapered surface cutting a ring of material from said confronting surface of said expandable sleeve structure as said pin head moves axially into said expandable sleeve structure with said ring moving into engagement with said bulbed portion whereby the strength of said blind head is increased.

19. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head;

said pin shank having a securing portion comprising a plurality of securing grooves defined by a helical thread form, sleeve means including a main sleeve structure having an elongated sleeve shank portion, said sleeve shank portion adapted to be located in the aligned openings in the workpieces, said main sleeve structure adapted to receive said pin shank, said sleeve means further comprising an expandable sleeve structure adapted to receive said pin shank and being located on said pin shank between said pin head and said main sleeve structure and being operatively connected with said main sleeve structure, engaging means operatively connected with said sleeve means and including a nut member having a mating thread form adapted to be threadably engaged with the thread form of said securing grooves on said pin shank, said nut member adapted to be engaged by the installation tool whereby the relative axial force can be provided by the torque applied by the installation tool between said pin member and said nut member to clamp the workpieces together at a relative axial force of a first magnitude, said expandable sleeve structure being radially deformable in response to the relative axial force of a second magnitude less than said first magnitude to form an enlarged blind head for reacting against the blind side surface, said sleeve means including collapsible means adapted to collapse at a third magnitude of relative axial force less than said first magnitude and greater than said second magnitude with said main sleeve structure and said expandable sleeve structure moving out of an axial load bearing connection whereby said blind head will engage the blind side surface such that said first magnitude of relative axial force and the final clamp load applied to the workpieces will be substantially between said pin, said blind head and said nut member, said collapsible means adapted to be located generally externally of the aligned openings at the accessible side surface of the workpieces, said collapsible means including a load bearing member adapted to be in operative engagement with the accessible side surface of the workpieces and a frangible structure operatively connected with said load bearing member, said load bearing member having a generally, axially extending receiving bore adapted to receive said main sleeve structure, said frangible structure being supported by said load bearing member in a position partially blocking said receiving bore, said frangible structure being engageable by the outer end of said main sleeve structure and having a preselected shear area adapted to shear upon application of said third magnitude of relative axial force whereby said main sleeve structure can move axially into said receiving bore, said pin shank having an irregularly shaped end portion adapted to be matingly engaged by the installation tool whereby torque can be applied between said pin member and said nut member.

20. The blind bolt of claim 19 with said load bearing member comprising an enlarged bearing washer located between said nut member and said outer end of said main sleeve structure and adapted to engage the accessible side surface of the workpieces.

21. The blind bolt of claim 20 with said frangible structure comprising a generally flat shear washer member having an outer diameter larger than that of said receiving bore, said bearing washer having a counterbore at its inner end of an axial depth and diameter to generally matingly receive said shear washer member, said shear washer member partially blocking said receiving bore to thereby define with said receiving bore a shear section, said shear section defining said preselected shear area by a preselected thickness and adapted to collapse in shear at said third magnitude of relative axial force applied thereto by said main sleeve structure.

22. The blind bolt of claim 21 with said main sleeve receiving said shank of said pin with a relatively close tolerance fit, said shear washer member having a central bore of a diameter less than that of said counterbore and of a size to receive said shank of said pin in relatively close tolerance fit to provide alignment of said main sleeve with said shear section of said shear washer member.

23. The blind bolt of claim 20 with said frangible structure comprising a generally flat flange member operatively connected with said main sleeve, said flange member having an outer diameter larger than that of said receiving bore, said bearing washer having a counterbore at its inner end of an axial depth and diameter to generally matingly receive said flange member, said flange member partially blocking said receiving bore to thereby define with said receiving bore a shear section, said shear section defining said preselected shear area by a preselected thickness and adapted to collapse in shear at said third magnitude of relative axial force applied thereto by said main sleeve structure.

24. The blind bolt of claim 23 with said main sleeve receiving said shank of said pin with a relatively close tolerance fit, said flange structure having a central bore of a diameter less than that of said counterbore and of a size to receive said shank of said pin with a relatively close tolerance fit to provide alignment of said main sleeve with said shear section of said flange structure.

25. The blind bolt of claim 24 with said flange structure being integral with said main sleeve.

26. The blind bolt of claim 24 with said flange structure being a part of a separate flanged sleeve member having a shank portion adapted to be located within said aligned openings of the workpieces in engagement with the outer end of said main sleeve.

27. The blind bolt of claim 20 with said bearing washer being of a generally flat configuration, said nut member having an enlarged counterbore at its inner end defining said receiving bore, said bearing washer adapted to be engaged by said nut member in load bearing engagement with the accessible side surface, said bearing washer having a central bore of a diameter less than that of said counterbore and adapted to partially block said receiving bore to thereby define with said receiving bore a shear section, said shear section defining said preselected shear area by a preselected thickness and adapted to collapse in shear at said third magnitude of relative axial force applied to said main sleeve section.

28. The blind bolt of claim 27 with said receiving bore defining a grip cavity of preselected length generally equal to the grip range of the fastener, where the grip range is defined as the difference between the minimum and maximum total thickness of the workpieces that a single fastener can secure together.

29. A blind bolt for securing a plurality of workpieces at a desired clamp load with the workpieces having aligned openings therein and having an accessible side surface and a blind side surface and adapted to be installed by a relative axial force applied by an installation tool from the accessible side surface of the workpieces, said blind bolt comprising:

a pin member having an elongated pin shank terminating at one end in an enlarged pin head;

said pin shank having a securing portion comprising a plurality of securing grooves, sleeve means comprising a generally elongated tubular sleeve structure adapted to receive said pin shank, said tubular sleeve structure including a first sleeve shank portion adapted to be located in the aligned openings in the workpieces and a second sleeve shank portion being located on said pin shank between said pin head and said first sleeve shank portion and being operatively connected with said first sleeve shank portion, engaging means operatively connected with said sleeve means and including an engaging structure adapted to be engaged by the installation tool whereby the relative axial force can be applied by the installation tool between said pin member and said engaging means to clamp the workpieces together at a relative axial force of a first magnitude, said second sleeve shank portion being radially deformable at a location between said pin head and the blind side surface of the workpieces in response to the relative axial force of a second magnitude less than said first magnitude to form an enlarged blind head with a bulbed formation for reacting against the blind side surface, said sleeve means including load bearing means for transmitting the relative axial force of said second magnitude to said second sleeve shank portion through said first sleeve shank portion and responsive to a third magnitude of relative axial force less than said first magnitude and greater than said second magnitude with said first sleeve shank portion moving out of an axial load bearing relationship with said pin head whereby said bulbed formation of said blind head will engage the blind side surface such that said first magnitude of relative axial force and the final clamp load applied to the workpieces will be substantially between said pin, said blind head and said engaging means, said second sleeve shank portion having a through bore, said pin head adapted to move into said through bore of said second sleeve shank portion after said bulbed formation of said blind head is formed and is in load bearing engagement with said blind side surface to radially outwardly expand that end of said second sleeve shank portion in response to a relative axial force of an intermediate magnitude greater than said second magnitude and less than said first magnitude to form said enlarged blind head with a tulip shaped formation located adjacent to said bulbed formation, said blind bolt being applicable for securing workpieces varying in total thickness over a wide grip range with said grip range being defined as the difference between a minimum and a maximum total thickness of the workpieces that said blind bolt of a single, fixed construction can secure together, said blind head with said pin head defining a generally uniform shape over said wide grip range for said single, fixed construction of said blind bolt, said load bearing means adapted to be located generally externally of the aligned openings at the accessible side surface of the workpieces, securing means on said pin shank, said engaging means including an engaging structure operable with said securing means for connecting said pin member and said engaging structure together.

30. The blind bolt of claim 29 with said pin head having a radially outwardly extending inner surface tapering radially outwardly and axially in a direction away from said pin head thereby defining an inner tapered surface, said expandable sleeve structure having an outer diameter generally equal to that of said inner tapered surface whereby said inner tapered surface abuts the confronting surface of said expandable sleeve structure, said inner tapered surface cutting a ring of material from said confronting surface of said expandable sleeve structure as said pin head moves axially into said expandable sleeve structure with said ring moving into engagement with said bulbed formation whereby the strength of said blind head is increased.

* * * * *